May 24, 1960     J. G. FORGY ET AL     2,937,544
ANCHORING SLEEVE FOR ROTARY TOOL
Filed May 12, 1958
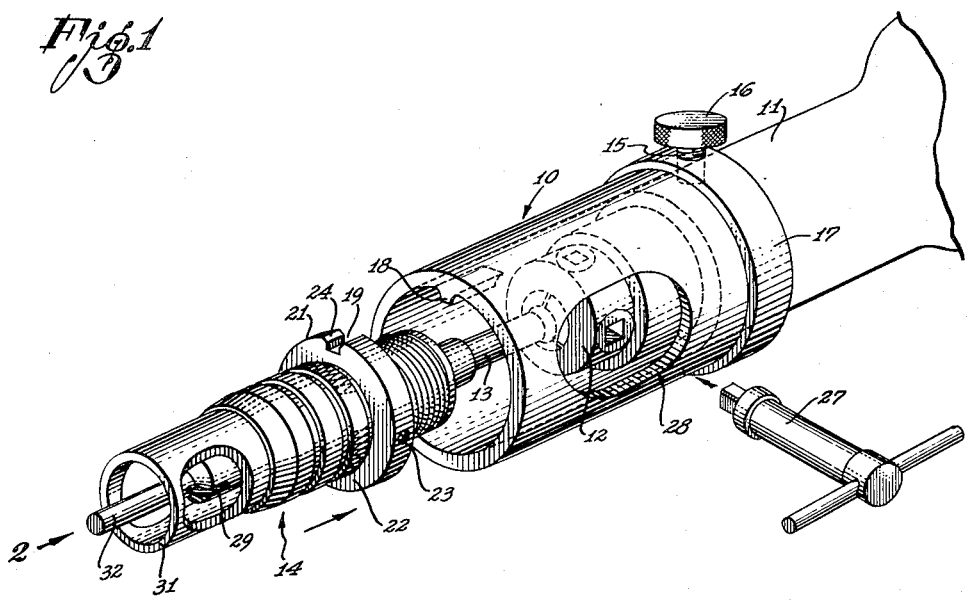
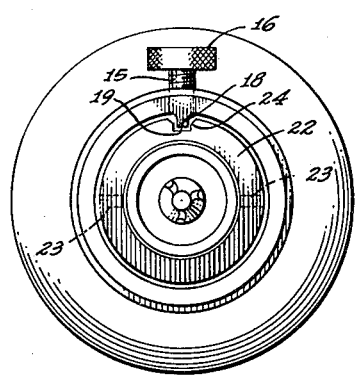
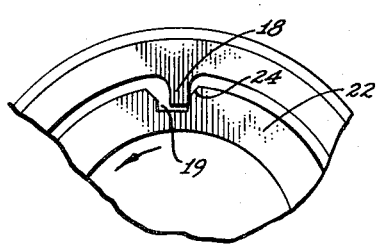
INVENTORS:
John G. Forgy
George C. Koons
Attorneys

United States Patent Office 2,937,544
Patented May 24, 1960

2,937,544

ANCHORING SLEEVE FOR ROTARY TOOL

John G. Forgy, Long Beach, and George C. Koons, Bell, Calif., assignors to Martin Aircraft Tool Co., South Gate, Calif., a corporation of California Filed May 12, 1958, Ser. No. 734,458

4 Claims. (Cl. 77—55)

This invention relates to an accessory for use with cutting tools having means for regulating the depth of penetration of rotary cutting elements of the tools.

While the principles involved are applicable to various types of cutting tools, especially where accuracy and uniformity of cut are desired, the present invention is particularly adapted for use with devices serving to regulate the depth of cut of countersinking tools and for the purposes of disclosure and illustration, the present invention will be described in its application as an accessory for use with a countersinking tool of the type shown and described in the United States Patent No. 2,608,114.

In countersink tools of the type shown in the above identified patent, a countersink cutter is rotatably driven by a shaft mounted for limited controlled axial movement relative to a stop element circumscribing the countersink cutter. In such tools the axial movement of the cutter-driving shaft relative to the stop element determines the depth of the countersink and the stop element is of necessity engaged with the workpiece. Although the circumscribing stop element is so mounted as to remain stationary as the shaft is driven, it has been found that the friction inherent in all bearing structures of foreign particles lodging in the bearing structure supporting the shaft produces rotation of the stop element with the shaft.

As the stop member is engaged with the workpiece, rotation of the stop member tends to score the workpiece as the cutter is completing the desired work operation. Scoring of the workpiece not only may place unsightly and undesired marks thereon, but, when the particular workpiece carries a protective coating or film, a scoring which penetrates the protective film may undesirably expose the core of the workpiece and permit corrosion in the scored area. For this reason, efficient operators of tools of this type make every effort to prevent the stop member from rotating with the shaft and the cutter element connected thereto.

In the use of such cutting devices prior to the present invention, whenever the stop element tends to rotate with the shaft, the operator has been required to grasp the stop member to hold the same against rotation. This, as will be understood, ties up one hand of the operator of the tool when quite frequently the operator should have both hands available, one to operate the tool and the other to guide the same or hold or perform some other operation on the workpiece. Furthermore, in some installations there is not sufficient space available for the insertion of a hand of the operator to hold the stop element against rotation, and in such installations, scoring of the workpiece has been very difficult, if not impossible to prevent.

The accessory of the present invention is adapted to prevent rotation of the stop member so the undesirable scoring of the workpiece cannot occur and to do so without the necessity of the operator using one of his hands for manually holding the stop member against rotation. In the now preferred embodiment of the present invention, this is accomplished by providing an outer sleeve-like member which is secured against rotation by attachment directly to the housing of the motor to which the tool shaft is coupled. The inner wall surface of this sleeve-like member is provided with a key extending parallel to the axis of the housing and adapted to slidably engage in a keyway formed in an annular member or collar secured to the stop member of the countersink tool.

The collar may move axially relative to the fixed sleeve as the relative movement between the cutter and stop element progresses in the work operation but the coaction between the collar and sleeve effectively prevents the collar and consequently the stop member from rotating with the tool shaft.

In the now preferred embodiment of the sleeve member, access openings are provided to permit operation of the chuck or other holder element coupling the tool to the motor. Furthermore, once the sleeve is attached directly to the motor housing, it does not complicate use of the countersinking tool and only slightly increases the overall dimension of the same.

Other features and advantages of the present invention will be apparent from the following detailed description, particularly when taken in connection with the accompanying drawing, and which:

Fig. 1 is a perspective view, partially exploded, showing the accessory of the present invention;

Fig. 2 is an end elevational view taken in the direction of the arrow 2 in Fig. 1; and Fig. 3 is a fragmentary view showing the coaction of the key of the sleeve with the keyway of the collar.

The device of the present invention, referring now to the accompanying drawing and more particularly to Fig. 1 thereof, comprises essentially means for interconnecting the stop element assembly of a tool of the type shown in United States Patent No. 2,608,114 with the housing of the motor to which the tool shaft is coupled. The means so interconnects the stop element assembly and the motor housing as to permit the necessary relative axial movement between the tool shaft and the stop element assembly but yet positively holds the latter against rotation under the urging of the tool shaft as the same is rotatably driven.

In the illustrated embodiment of the accessory of the present invention, the means for interconnecting the stop element assembly and the motor housing comprises a sleeve 10 to be telescopically mounted to the portion of the motor housing 11 sleeving the chuck 12 for coupling the shaft 13 of the countersink tool 14 to the motor, not shown. To hold the sleeve 10 to the motor housing 11, a tapped radially extending bore is formed in the wall of the sleeve 10 adjacent to the one end thereof for receiving a lock screw 15 having a knurled head or knob 16. To strengthen and reinforce the end portion of the sleeve 10 in which the tapped bore is formed, it is now preferred to form an integral collar 17 thereabout. To mount the sleeve about the housing portion 11 is only necessary to slidably fit the sleeve over the portion 11 after which the lock screw is tightened to fix the sleeve to the housing.

The end portion of the sleeve opposite the collar 17 is provided with an elongate rib 18 carried internally of the sleeve end projecting radially inwardly thereof. The rib 18 extends axially inwardly from the one end of the sleeve 10 substantially parallel to the longitudinal axis of the sleeve and forms a key adapted to cooperate with a keyway or slot 19 formed in a collar 21. The collar 21 is formed with an inner diameter slightly in excess of the diameter of the body portion 22 of the countersink tool 14. The collar 21 is intended to be circumscribingly mounted about the tool 14 and attached thereto by means of plurality of set screws 23 threaded into tapped openings formed in the collar 21 as best shown in Fig. 2 of the drawing.

The slot 19 formed in the collar 21 is chamfered as indicated at 24 to facilitate reception of the key 18 of the sleeve 10. Perferably, the slot or keyway 19 is formed of a width somewhat in excess of the width of the key 18 to further simplify reception of the key 18 into the slot in the use of the accessory.

After the sleeve 10 has been mounted about the motor housing portion 11 and fixed thereto by the lock or set screw 15 and the collar is properly mounted to the tool 14, the tool shaft 13 is inserted into the chuck 12 and jaws of the chuck tightened by a suitable wrench such as indicated at 27, the sleeve 10 being formed with at least one access opening 28 to permit access to the chuck. It will be understood that as the tool shaft 13 is inserted between the jaws of the chuck, the tool 14 will be rotated to bring the keyway 19 into alignment with key 18 after which the tool moved bodily into the open end of the sleeve 10. With the tool now properly mounted within the sleeve 10, the coaction between the key 18 and keyway 19 permits the necessary relative axial movement between the tool shaft 13 and the body member 22 of the tool 14, which as taught by the hereinabove mentioned United States patent, limits the movement of a countersink cutter element 29 and a circumscribing stop element 31 which is coupled to and forms a part of the body member 22 of the tool 14.

In the use of the accessory with the countersink tool of the type shown, the workpiece is generally pre-drilled, and a pilot pin 32 of the countersink cutter is engaged in the preformed drilled opening to properly locate the countersink cutter 29. After the pilot pin 32 is properly engaged, the operator through a thrust applied to the motor housing, moves the countersink cutter 29, relative to the body member 22, into engagement with the workpiece to form the desired countersink. Because of the particular construction of the countersink tool 14, the relative axial movement of the countersink cutter 29 and the stop element 31 may be pre-set to limit the depth of the cut of the cutter element 29. This structure forms no part of the present invention, being fully described and claimed in the above mentioned United States patent.

In the above described use of the tool as the collar is securely locked to the body 22 of the tool 14, the body 22 including the stop element 31 is effectively held against rotation relative to the sleeve 10 through the coaction of the key 18 and the keyway 19 of the collar 21. As the sleeve 10 is securely mounted through the set screw 15 to the non-rotating motor housing portion 11, the stop element is effectively held against rotation under the urging of the tool shaft 26 as the latter is rotatably driven by the motor.

The means interconnecting the stop element 31 and the motor housing 11 do not, as will now be understood, limit in any way the necessary relative movement between the cutter element 29 and the stop element 31. The accessory of the present invention, therefore in no way complicates the use of the countersink tool 14, yet effectively prevents rotation of the stop element as the cutter element is completing the countersink tool operation. This, as will now be understood, prevents any undesirable scoring of the workpiece by the stop element 31 because of rotation of the latter and without any special attention on the part of the operator.

Although the now preferred embodiment of the present invention has been shown and described herein, it is to be understood that the invention is not to be limited thereto, for it is susceptible to changes in form and detail within the scope of the appended claims.

We claim:
1. An accessory for use with a combination of a rotary cutting tool for axial advance into a workpiece, a stop element rotatably engaging the cutting tool at a predetermined axial position relative thereto for traveling with the cutting tool into abutment with the workpiece to limit the depth of penetration of the cutting tool, and a power means having a chuck for releasably holding the cutting tool and actuating same, said power means having a housing with a leading portion concentric to the chuck, the purpose of the accessory being to prevent rotation of said stop element by the cutting tool thereby to keep the stop element from marring the surface of the workpiece, said accessory comprising: a first member for fixed engagement with said stop element; a second member for fixed engagement with said portion of the housing, said two members being keyed together against rotation relative to each other with freedom for axial movement relative to each other whereby the two members hold the stop element against rotation but permit variation in the axial position of the stop member relative to said housing.

2. An accessory for use with a combination of a rotary cutting tool for axial advance into a workpiece, a stop element rotatably engaging the cutting tool at a predetermined axial position relative thereto for traveling with the cutting tool into abutment with the workpiece to limit the depth of pentration of the cutting tool, and a power means having a chuck for releasably holding the cutting tool and actuating same, said power means having a housing with a leading portion concentric to the chuck, the purpose of the accessory being to prevent rotation of said stop element by the cutting tool thereby to keep the stop element from marring the surface of the workpiece, said accessory comprising: a first member for fixed engagement with said stop element; and a second member in the form of a sleeve to be fixedly connected to said housing portion in a position to surround said chuck and to extend from the housing portion to said first member, said second member having a side opening for access to said chuck, one of said two members having a longitudinal keyway and the other of the two members having a projection slidingly engaging said keyway.

3. An accessory as set forth in claim 2 in which said first member is in the form of a collar to surround said stop element, said collar being provided with means for releasable engagement with the stop element; and in which said second member is provided with manually operable means for releasable engagement with said housing portion.

4. An accessory as set forth in claim 2 in which said keyway is open at one end to permit said two members to be separated by relative longitudinal movement.

References Cited in the file of this patent
UNITED STATES PATENTS 2,301,151     Spievak     Nov. 3, 1942
2,868,044     Chaffee et al.     Jan. 13, 1959